United States Patent [19]

Pardy

[11] Patent Number: 4,708,028
[45] Date of Patent: Nov. 24, 1987

[54] OPERATING LEVER MECHANISM

[75] Inventor: Ronald P. Pardy, Tiptree, England

[73] Assignee: Ford Motor Company, Dearborn, Mich.

[21] Appl. No.: 418,887

[22] Filed: Sep. 16, 1982

Related U.S. Application Data

[63] Continuation of Ser. No. 156,302, Jun. 4, 1980, abandoned.

[51] Int. Cl.[4] .............................................. G05G 1/14
[52] U.S. Cl. ........................................ 74/512; 74/516
[58] Field of Search ......................... 74/512, 516, 107

[56] References Cited

U.S. PATENT DOCUMENTS

| | | | |
|---|---|---|---|
| 2,001,415 | 5/1935 | Freeman | 74/512 |
| 3,048,980 | 8/1962 | Cousino et al. | |
| 3,052,130 | 9/1962 | Kellogg et al. | 74/561 X |
| 3,766,802 | 10/1973 | Shellhause | |
| 3,885,449 | 5/1975 | Green | 74/512 |

FOREIGN PATENT DOCUMENTS

| | | |
|---|---|---|
| 1455682 | 10/1963 | Fed. Rep. of Germany |
| 7036827 | 2/1973 | Fed. Rep. of Germany |
| 7032726 | 11/1973 | Fed. Rep. of Germany |
| 1418958 | 10/1964 | France |

Primary Examiner—Gary L. Smith
Assistant Examiner—Rodney M. Lindsey
Attorney, Agent, or Firm—Peter D. McDermott; Roger L. May

[57] ABSTRACT

An operating lever mechanism 10 for a hydraulic brake cylinder 28 includes a pedal 12 and a link 26 operable connected at one end to a hydraulic piston 29 and the cylinder 28 and at the other end to the pedal 12. Movement of the pedal 12 is transferred to the link 26 by means of a complementary abutment surface 22 on pedal 12 and abutment surface 34 on link 26. A shaft 36 extends from the end of the link 26 through an aperture 24 in the pedal by an amount "a" when surfaces 22 and 24 abut; the distance "a" being equal to or greater than the distance "b" through which the pedal 12 about aperture 24 travels when the pedal moves between its rest and engaged positions. The shaft 36 and aperture 24 retain the abutment surfaces 22 and 34 in alignment even when the abutment surfaces are separated by distances equal to or greater than the travel of the lever at the point of the abutment surface 22 about aperture 24.

10 Claims, 2 Drawing Figures

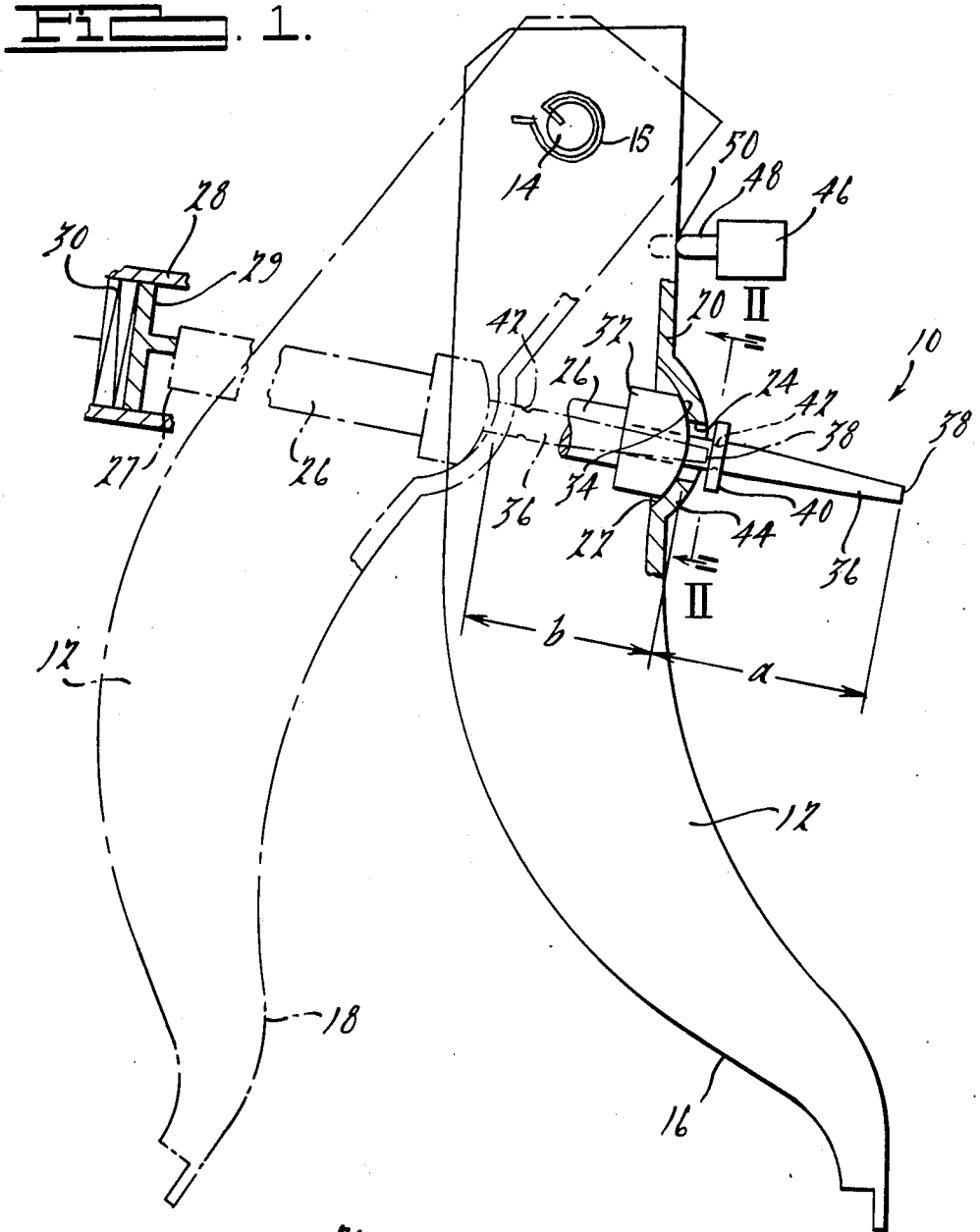
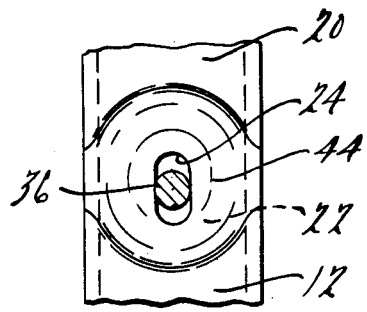
FIG. 1.
FIG. 2.

OPERATING LEVER MECHANISM

This is a continuation of application Ser. No. 156,302, filed June 4, 1980 and now abandoned.

BACKGROUND OF THE INVENTION

1. Field of the Invention

This invention relates to an operating lever mechanism for devices such as hydraulic cylinders and in particular to operating mechanisms for motor vehicle brake master cylinders.

2. Disclosure Information

Conventional motor vehicle brake master cylinders are operated by a pedal lever mounted for pivotal movement by an operator between a rest position and an engaged position. The pedal is connected to the hydraulic cylinder by a link which is reciprocably movable in the plane of movement of the lever. The connection between the link and the lever usually comprises a clevis on the lever which is connected to a prong or clevis on the link by means of a pivot pin which lies transverslly to the plane of movement of the lever with the pin being held in place by a split pin.

Although this construction is usually fully effective, the lever and link can become detached from each other if per chance the split pin and pivot pin become disengaged from the clevises.

SUMMARY OF THE DISCLOSURE

According to the present invention an operating lever mechanism includes a lever pivotally mounted about a pivot pin and includes an abutment surface with an aperture therethrough. A link has an abutment surface which abuts the abutment surface of the lever. The other end of the link is operably connected to a hydraulic master cylinder. A shaft extends from the abutment surface of the link through the aperture of the abutment surface of the lever and extends beyond the aperture a distance greater than the distance the abutment surface of the lever travels when the lever moves between its rest and engaged position.

Preferably, in one embodiment a snap ring fits on the shaft which is engaged by the lever when the lever is returned from its engaged position to its rest position to insure that the link always quickly follows the movement of the lever even when the lever is suddenly moved into its rest position.

More broadly, the operating mechanism includes a lever having abutment surface and link having a corresponding abutment surface abutting the abutment surface of the lever when the lever is moved from its rest to engaged position and a system for retaining alignment of the lever with the link when the abutment surface of the link is separated from the abutment surface of the lever a distance equal to or greater than the normal distance the abutment surface of the lever travels between its engaged position and rest position.

BRIEF DESCRIPTION OF THE DRAWINGS

A preferred embodiment of the invention will now be described, by way of example only, with reference to the drawings, in which:

FIG. 1 is a schematic side view of an embodiment of an operating mechanism according to the invention; and FIG. 2 is a partial end view of the mechanism shown in FIG. 1 taken along the line II—II.

DETAILED DESCRIPTION OF THE PREFERRED EMBODIMENT

Referring to the drawings, an operating mechanism 10 includes a lever which can be in the form of a brake pedal 12 pivotally mounted about a transverse pin 14 for movement between a rest position indicated at 16 and an engaged position indicated at 18. The lever 12 is biased from the engaged position towards its rest position by a coil spring 15 of conventional construction acting upon the pivot pin 14.

A flange 20, more clearly shown in FIG. 2, is formed on the rear surface of the pedal 12. A portion of the flange 20 is curved rearwardly to form a forward facing abutment surface 22 having a concave shape. An elongated slotted aperture 24 is provided through the concave surface 22.

A link 26 in the form of a rod has one end 27 operably connected to a hydraulic brake master cylinder 28. More specifically the rod end 27 is directly connected to the piston 29 which is slidably received in the brake master cylinder 28. The piston 29 is slidable between a rest position corresponding to the rest position of the pedal 12 and an engaged position corresponding to the engaged position of pedal 12. A spring 30 biases the piston 29 toward its rest position.

The other end of rod 26 has a nylon bushing 32 secured thereon. The nylon bushing has a convex abutment surface 34 which is complementary to the concave surface 22 of the lever 12.

A shaft 36 extends from the rod 26 beyond the convex abutment surface 34 and through aperture 24 in the lever 12. The length of shaft 36 is sufficiently long such that when the abutment surfaces 22 and 34 abut, the end 38 of shaft 36 is a distance "a" from the convex abutment surface 22 which is equal to or greater than the distance "b" as shown in FIG. 1, through which the abutment surface 22 about aperture 24 travels when the pedal is moved between its rest position 16 and its engaged position 18.

A snap ring 40 is mounted in a circumferential groove 42 on the shaft 36 adjacent the rearwardly facing convex surface 44 of flange 20.

A brake warning light switch 46 has a spring loaded contact 48 which abuts the pedal 12 at point 50 when the pedal is in its rest position 16. The spring loaded contact 48 exerts a small bias onto the pedal 12 toward its engaged position 18 when the pedal is in its rest position 16. The switch 46 is actuated when the spring loaded contact 48 is released when the pedal 12 is moved to its engaged position 18.

OPERATION

In use, movement of the pedal 12 toward the engaged position 18 causes abutment surface 22 to exert force onto complementary abutment surface 34 of the nylon bushing 32 which forces link rod 26 to move in a forward motion which causes the piston 29 to slide in the cylinder 28 thus actuating the brake system. During the engagement of pedal 12, the elongation of slotted aperture 24 accomodates the relative vertical movement of the shaft 36 and pedal 12 during the travel of the pedal 12.

When the pedal 12 is released, the pedal normally returns to its rest position under the biasing influence of the coil spring 15 about the pivot pin 14 and the spring 30 forces the rod 26 to move towards its rest position which maintains the abutment surfaces 22 and 34 adjacent each other. If per chance the pedal 12 undergoes a rapid motion from its engaged position to its rest position, for example in the event the operator's foot slips off the brake pedal 12, the rearward facing wall 44 of the flange 20 abuts the snap ring 40 and pulls the link 26 back to its rest position.

If per chance the snap ring 40 is not engaged within groove 42 of the shaft 36, the link 26 retains its alignment with the abutment surface 22 of the pedal and does not become inoperatively disengaged from the pedal 12 or misaligned. The end 38 of shaft 36 maintains its engagement through aperture 24 even when the rod 26 is in its fully engaged position and the pedal is in its fully rested position 16. Under these circumstances, the rod 26 slides toward its rest position under the influence of spring 30 until the bushing 32 has its surface 34 with shaft 36 maintaining the correct alignment. The rod 26 continues to slide until the bushing 32 abuts the surface 22 of brake pedal 12.

In this fashion, the brake pedal system retains the alignment of the actuating link with the pedal under normal circumstances and other adverse circumstances when the operating lever mechanism works within it normal parameters.

Variations and modifications of the illustrated invention are possible without departing from its spirit and scope as defined by the appended claims.

The embodiments of the invention in which an exclusive property or privilege is claimed are defined as follow:

1. An operating lever mechanism including a lever pivotably mounted to a structure for pivotal movement between a rest position and an engaged position; and a link means connected at one end to move an operating device and at its other end to said lever to be reciprocably moved by said lever in the plane of movement of said lever; said operating lever mechanism characterized in that:

said lever includes an abutment surface;
said link means includes an abutment surface for abutting said abutment surface of said lever when said lever is moved from its rest position to its engaged position; and
retaining means coupled to the link means for movement therewith the retaining alignment of said lever with said link means when said abutment surface of said link means is separated from said abutment surface of said lever a distance equal to or greater than the normal distance said abutment surface of said lever travels when said lever moves between its engaged position its and rest position.

2. A mechanism as defined in claim 1 wherein said retaining means comprises a sliding coupling including a shaft mounted on said link means and an aperture through the lever sized to receive said shaft; and when said abutment surfaces abut each other, said shaft extends through said aperture a distance equal to or greater than the distance travelled by said abutment surface of said lever between said engaged position and said rest position.

3. A mechanism as defined in claim 2 wherein said shaft has a second abutment surface secured thereon engageable with said lever when said lever moves from its engaged position to its rest position.

4. A mechanism as defined in claim 3 wherein said second abutment surface comprises a snap ring secured in a groove on the shaft adjacent said lever.

5. An hydraulic cylinder operating assembly comprising:

an hydraulic cylinder and piston assembly with said piston reciprocally movable within said cylinder between a first and second position and spring biased toward said first position;
an operating linkage having one end operably connected to said hydraulic cylinder and piston assembly and another end connected to an operating lever;
said operating lever mounted to a structure for pivotal movement between a rest position and engaged position and spring biased toward said rest position;
said operating lever including an abutment surface;
said operating linkage including an abutment surface for engagement with said abutment surface of said operating lever when said operating lever is moved from its rest position to its engaged position, such that said operating linkage moves said piston towards its second position;
a shaft mounted on one of the operating lever or operating linkage for movement therewith and the other of the operating lever or operating linkage having an aperture therethrough sized to receive said shaft; and
when said abutment surfaces abut each other, said shaft has sufficient length such that it extends through said aperture a distance equal to or greater than the distance travelled by said abutment surface of said operating lever between said engaged position and said rest position.

6. A mechanism as defined in claim 5 wherein said shaft extends from said operating linkage and said aperture is located through said lever.

7. An hydraulic cylinder operating assembly comprising:

an hydraulic cylinder and piston assembly with said piston reciprocally movable with said cylinder between first and second position and spring biased toward said first position;
an operating linkage having one end operably connected to said hydraulic cylinder and piston assembly and another end connected to an operating lever;
said operating lever mounted to a structure for pivotal movement between a rest position and engaged position and spring biased toward said rest position;
said operating lever including an abutment surface;
said operating linkage including an abutment surface for engagement with said abutment surface of said operating lever when said operating lever is moved from its rest position to its engaged position, such that said operating linkage moves said piston toward its second position;
a shaft mounted on one of the operating lever or operating linkage for movement therewith and the other of the operating lever and operating linkage having an aperture therethrough sized to receive said shaft; and
when said abutment surfaces abut each other, said shaft has sufficient length such that it extends through said aperture a distance equal to or greater than the distance travelled by said abutment surface of said operating lever between said engaged position and said rest position;

wherein said shaft extends from said linkage and said aperture is located through said lever; and wherein said shaft has a second abutment surface secured thereon engageable with said lever when said lever moves from its engaged position to its rest position.

8. A mechanism as defined in claim 7 wherein said second abutment surface comprises a snap ring secured in a groove on the shaft adjacent said lever with said shaft extending past said snap ring.

9. An operating lever mechanism including a lever pivotably mounted to a structure for pivotable movement in a plane between a rest position and an engaged position; and a link means connected at one end to move an operating device and at its other end to said lever for reciprocating motion by said lever in the plane of motion of said lever; said operating lever mechanism characterized in that:

said lever includes an abutment surface;

said link means includes an abutment surface for abutting said abutment surface of said lever when said lever is moved from its rest position to its engaged position;

a shaft mounted on one of the lever or link means for movement with said lever or link means and an aperture through the other of said lever or link means sized to receive said shaft; and said shaft has a sufficient length such that when said abutment surfaces abut each other, said shaft extends through said aperture a distance equal to or greater than the distance travelled by said abutment surface of said lever between said engaged position and said rest position.

10. A mechanism as defined in claim 9 wherein said shaft extends from said link and said aperture is located through said lever.

* * * * *